(12) United States Patent
Ronald (10) Patent No.: US 10,434,849 B1
(45) Date of Patent: Oct. 8, 2019

(54) VAN DOOR ASSEMBLY

(71) Applicant: Mobility Accessories, Westland, MI (US)

(72) Inventor: James Ronald, Commerce Township, MI (US)

(73) Assignee: Mobility Accessories, Westland, MI (US)

( * ) Notice: Subject to any disclaimer, the term of this patent is extended or adjusted under 35 U.S.C. 154(b) by 85 days.

(21) Appl. No.: 15/938,289

(22) Filed: Mar. 28, 2018

Related U.S. Application Data

(60) Provisional application No. 62/503,650, filed on May 9, 2017.

(51) Int. Cl.
*B60J 5/06* (2006.01)
*B60J 5/04* (2006.01)
*B60R 21/21* (2011.01)
*B60R 21/00* (2006.01)

(52) U.S. Cl.
CPC ........... *B60J 5/0455* (2013.01); *B60J 5/0468* (2013.01); *B60R 21/21* (2013.01); *B60J 5/062* (2013.01); *B60R 2021/0006* (2013.01); *B60R 2021/0067* (2013.01)

(58) Field of Classification Search
CPC ......... E05Y 2900/531; E05Y 2900/132; E05Y 2900/506; B60J 5/0455; B60J 5/0468; B60J 5/062; B60R 21/21; B60R 2021/0006; B60R 2021/0067
USPC ...................................... 296/146.13
See application file for complete search history.

(56) References Cited

U.S. PATENT DOCUMENTS

| | | | | |
|---|---|---|---|---|
| 3,905,638 | A * | 9/1975 | Persico | B60J 5/062 296/26.02 |
| 3,907,357 | A * | 9/1975 | Davis, Jr. | B60R 3/00 296/146.5 |
| 5,921,611 | A * | 7/1999 | Townsend | B60J 5/12 296/155 |
| 6,158,173 | A * | 12/2000 | Goodrich | B60J 5/06 49/213 |
| 6,595,547 | B2 * | 7/2003 | Smith | B60R 21/261 280/736 |
| 9,393,910 | B2 * | 7/2016 | Ronsen | B60R 3/02 |
| 2009/0174174 | A1 * | 7/2009 | McCoy | B60R 21/0132 280/749 |

* cited by examiner

*Primary Examiner* — Pinel E Romain
(74) *Attorney, Agent, or Firm* — Simpson & Simpson, PLLC (57) ABSTRACT

A van door assembly, including a header panel including a top surface and a door mechanism plate. The door mechanism plate includes a lip secured to the top surface, a plate connected to the lip, and a platform connected to the plate, wherein the platform is arranged substantially perpendicular to the plate.

20 Claims, 15 Drawing Sheets

VAN DOOR ASSEMBLY

This application claims the benefit under 35 U.S.C. § 119(e) of U.S. Provisional Patent Application No. 62/503,650, filed May 9, 2017, which application is incorporated herein by reference in its entirety.

FIELD

The present invention relates to van doorways, and, more particularly, to a van door assembly having a door mechanism bracket arranged such that the door mechanism does not interfere with the airbag.

BACKGROUND

Since at least 1998, many commercial vans have been fitted with side airbags. At first, vans were equipped with tubular shaped head side airbags. This airbag was designed to offer head protection in side impact collisions and also maintained inflation for up to seven seconds for rollover protection. However, this tubular shaped airbag design was quickly replaced by an inflatable curtain airbag. Side curtain airbags generally deploy from the roof. Roof-mounted curtain airbags protect both front and rear passengers. Curtain airbags have been said to reduce brain injury or fatalities by up to 45% in a side impact with a sport utility vehicle (SUV). These airbags come in various forms (e.g., tubular, curtain, door-mounted) depending on the needs of the application. Many recent SUVs and multi-purpose vehicles (MPV) have a long inflatable curtain airbag that protects all three rows of seats.

As automotive safety features become more capable of protecting vehicle occupants, side curtain air bags, which are designed to provide head and neck protection in rollover and side-impact collisions, have become popular. Many automakers offer them as a standard safety feature, even on their entry-level models. For Example, Ford Motor Company has developed an air bag for the 15-passenger Transit van. At nearly 15 feet long and 3 feet tall, the air bag relies upon two inflaters to fill its 11-gallon volume in a fraction of a second, and stays inflated for several seconds. A series of sensors activates the inflaters during a crash. The giant air bag, which is made from a coated, polyester cloth, is supported by the vehicle's B, C, and D pillars. However, these side curtain airbags often interfere with the mechanical door mechanism that opens and closes the van doors.

Therefore, there is a need for a van door assembly that supports a door mechanism such that there is no interference with the side curtain airbag.

SUMMARY

According to aspects illustrated herein, there is provided a van door assembly, comprising a header panel including a top surface, and a door mechanism plate, comprising a lip secured to the top surface, a plate connected to the lip, and a platform connected to the plate, wherein the platform is arranged substantially perpendicular to the plate.

The van or bus door assembly is compatible with side curtain airbags. To accomplish this the assembly incorporates a combination of a high mounted support bracket to hold the door opener motor and mechanism above the airbag in combination with door actuator rods that are extended downward from the opener mechanism to the doors. A plastic sheath or protective sleeve is arranged around each actuator rod to protect the airbag from damage that could be caused over time from the rotation of the actuator rods.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials, and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices, or materials similar or equivalent to those described herein can be used in the practice or testing of the example embodiments. The assembly of the present disclosure could be driven by hydraulics, electronics, and/or pneumatics.

It should be appreciated that the term "substantially" is synonymous with terms such as "nearly," "very nearly,"

"about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

Figure 1:
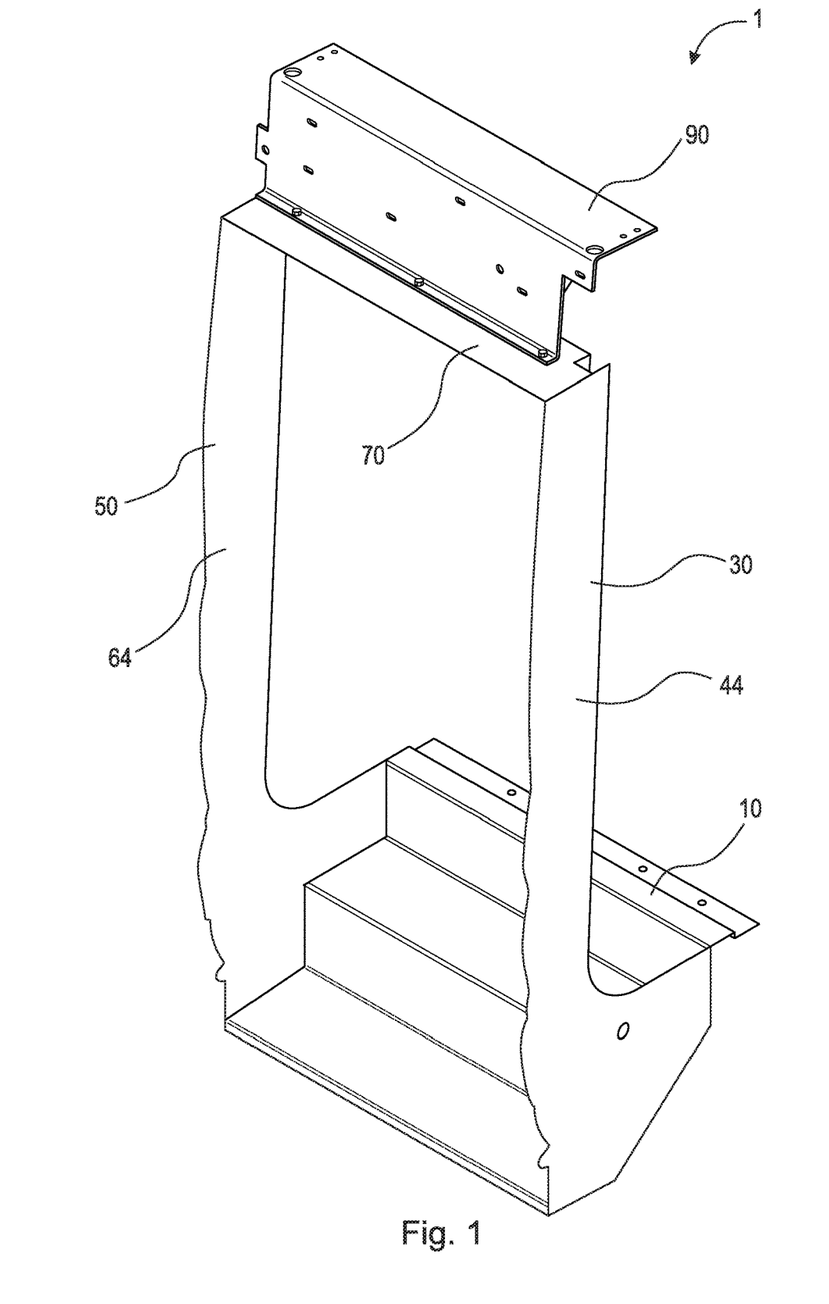
FIG. 1 is a top perspective view of a van door assembly.
Figure 2:
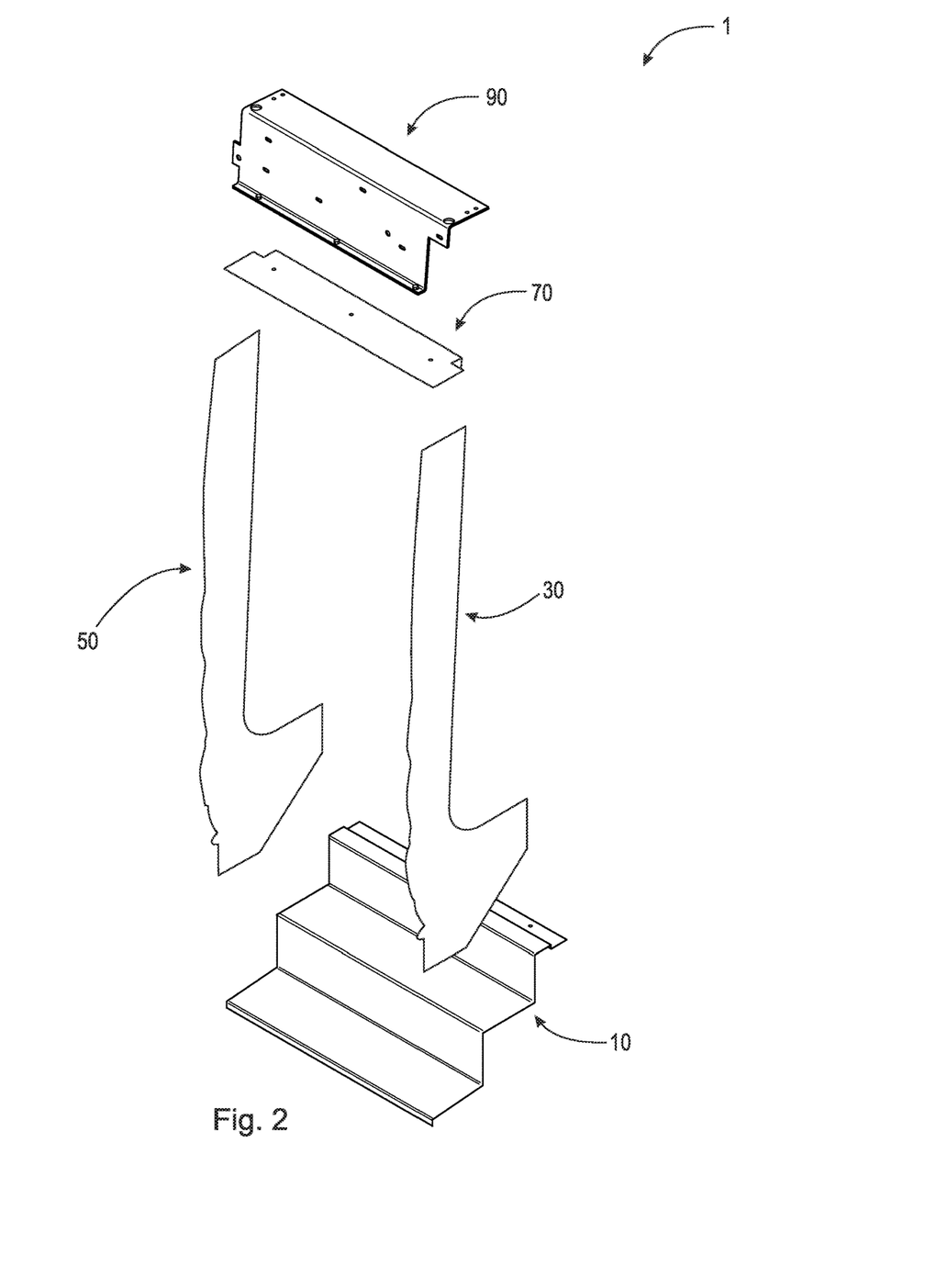
FIG. 2 is a top exploded perspective view of the van door assembly shown in FIG. 1.

Referring now to the figures, FIG. 1 is a top perspective view of van door assembly 1. FIG. 2 is a top exploded perspective view of van door assembly 1. Van door assembly 1 generally comprises steps 10, right wall 30, left wall 50, header panel 70, and door mechanism plate 90. Right wall 30 and left wall 50 are secured to steps 10. Header panel 70 is secured to right wall 30 and left wall 50. Door mechanism plate 90 is secured to header panel 70.

Figure 3:
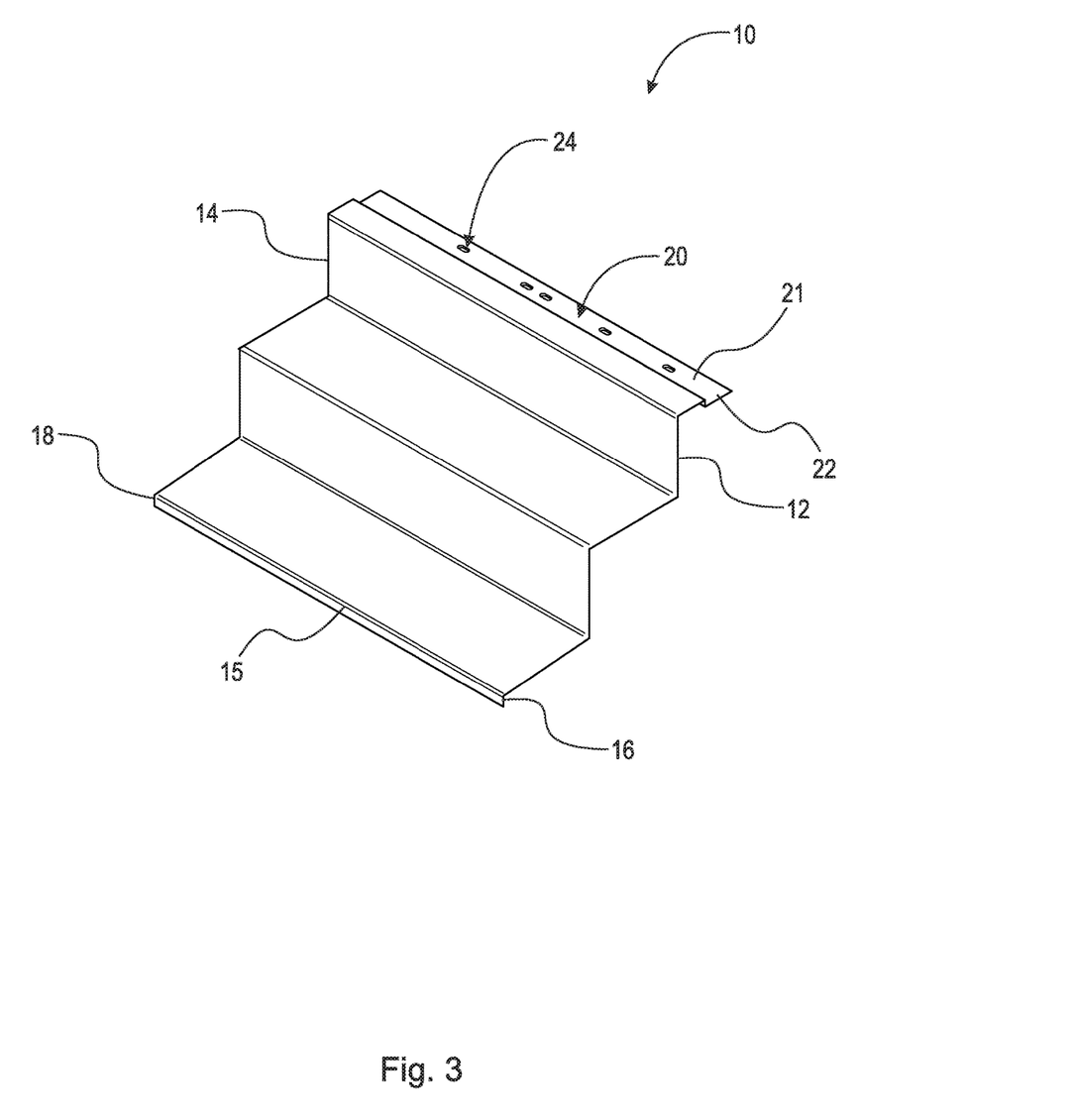
FIG. 3 is a top perspective view of the plurality of steps shown in FIG. 1.

FIG. 3 is a top perspective view of a plurality of steps 10. Steps 10 comprise side 12, side 14, threshold 20, and bottom lip 15. Threshold 20 comprises top surface 21, bottom surface 22, and a plurality of through-bores 24. Bottom lip 15 comprises side 16 and side 18. In the embodiment shown in the figures, steps 10 comprise three steps. Threshold 20 is preferably secured to the van, for example, to the van floor. In an example embodiment, bottom surface abuts the van floor and threshold 20 is secured to the van floor using fasteners (i.e., bolts or rivets). The fasteners secure threshold 20 to the van floor through a plurality of through-bores 24. In an example embodiment, threshold 20 is welded to the van floor, or secured to the van floor using an adhesive. It should be appreciated, however, that steps 10 may comprise any number of steps suitable for entry into a van.

Figure 4A:
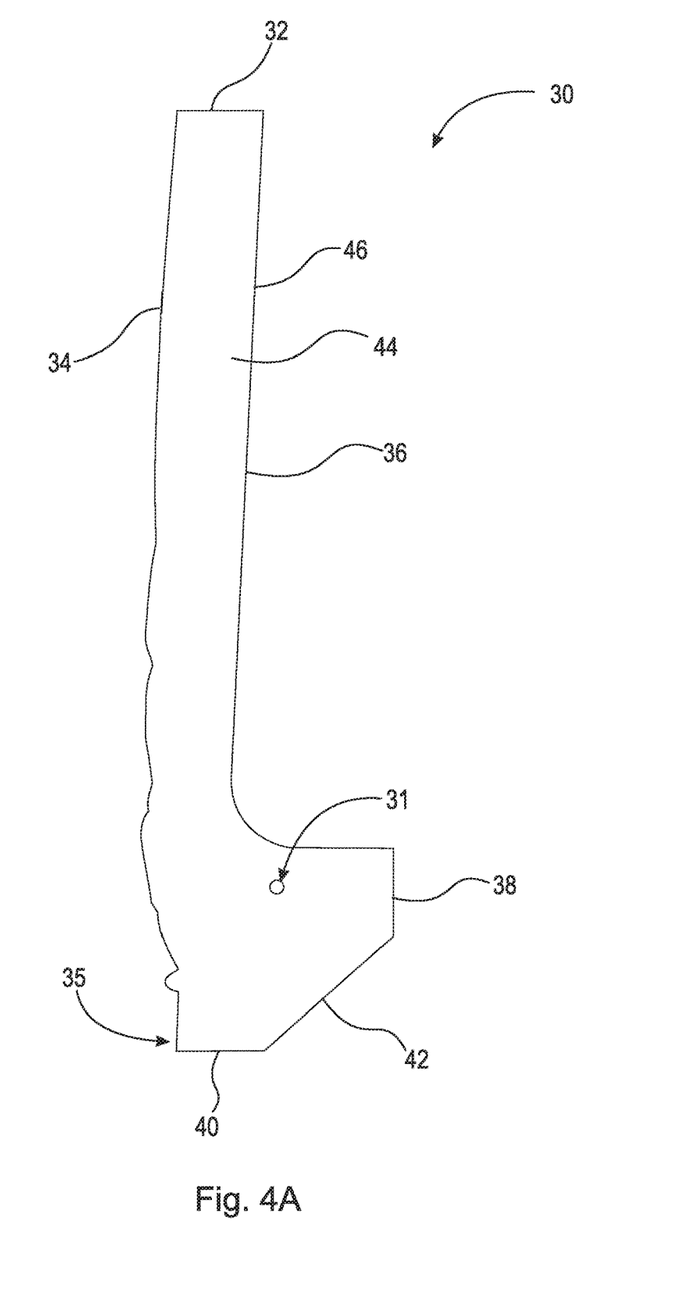
FIG. 4A is a side elevational view of the right wall shown in FIG. 1.

FIG. 4A is a side elevational view of right wall 30. Right wall 30 comprises through-bore 31, top edge 32, front edge 34, edge portion 35, rear edge 36, edge 38, bottom edge 40, edge 42, outer surface 44, and inner surface 46. To secure right wall 30 to steps 10, edge 38 is secured to side 12 and front edge 34 is secured to side 16 at edge portion 35. Any suitable means of securing right wall 30 to steps 10 may be used, for example, using welds or fasteners. In the embodiment, shown in the figures, front edge 34 comprises a plurality of curvatures. In an example embodiment, front edge 34 is substantially linear. Right wall 30 is secured to the van. For example, outer surface 44 is secured to the van using welds, adhesives, fasteners, or any suitable means. In an example embodiment, right wall 30 is not secured to the van. A door is secured to inner surface 46. In an example embodiment, through-bore 31 is arranged for a stepwell light and a corresponding wiring harness (not shown).

Figure 4B:
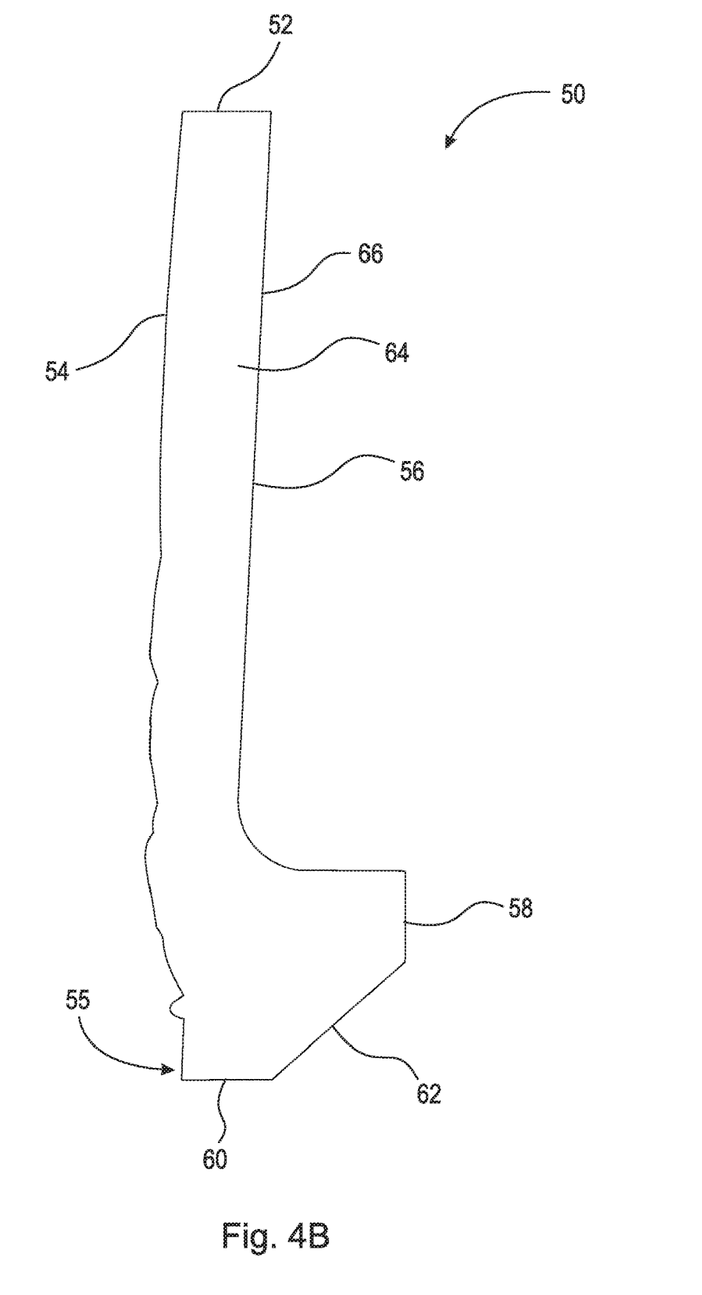
FIG. 4B is a side elevational view of the left wall shown in FIG. 1.

FIG. 4B is a side elevational view of left wall 30. Left wall comprises top edge 52, front edge 54, edge portion 55, rear edge 56, edge 58, bottom edge 60, edge 62, inner surface 64, and outer surface 66. To secure left wall to steps 10, edge 58 is secured to side 14 and front edge 54 is secured to side 18 at edge portion 55. Any suitable means of securing right wall 30 to steps 10 may be used, for example, using welds or fasteners. In the embodiment, shown in the figures, front edge 54 comprises a plurality of curvatures. In an example embodiment, front edge 54 is substantially linear. Left wall 50 is secured to the van. For example, outer surface 66 is secured to the van using welds, adhesives, fasteners, or any suitable means. In an example embodiment, left wall 50 is not secured to the van. A door is secured to inner surface 64.

Figure 5:
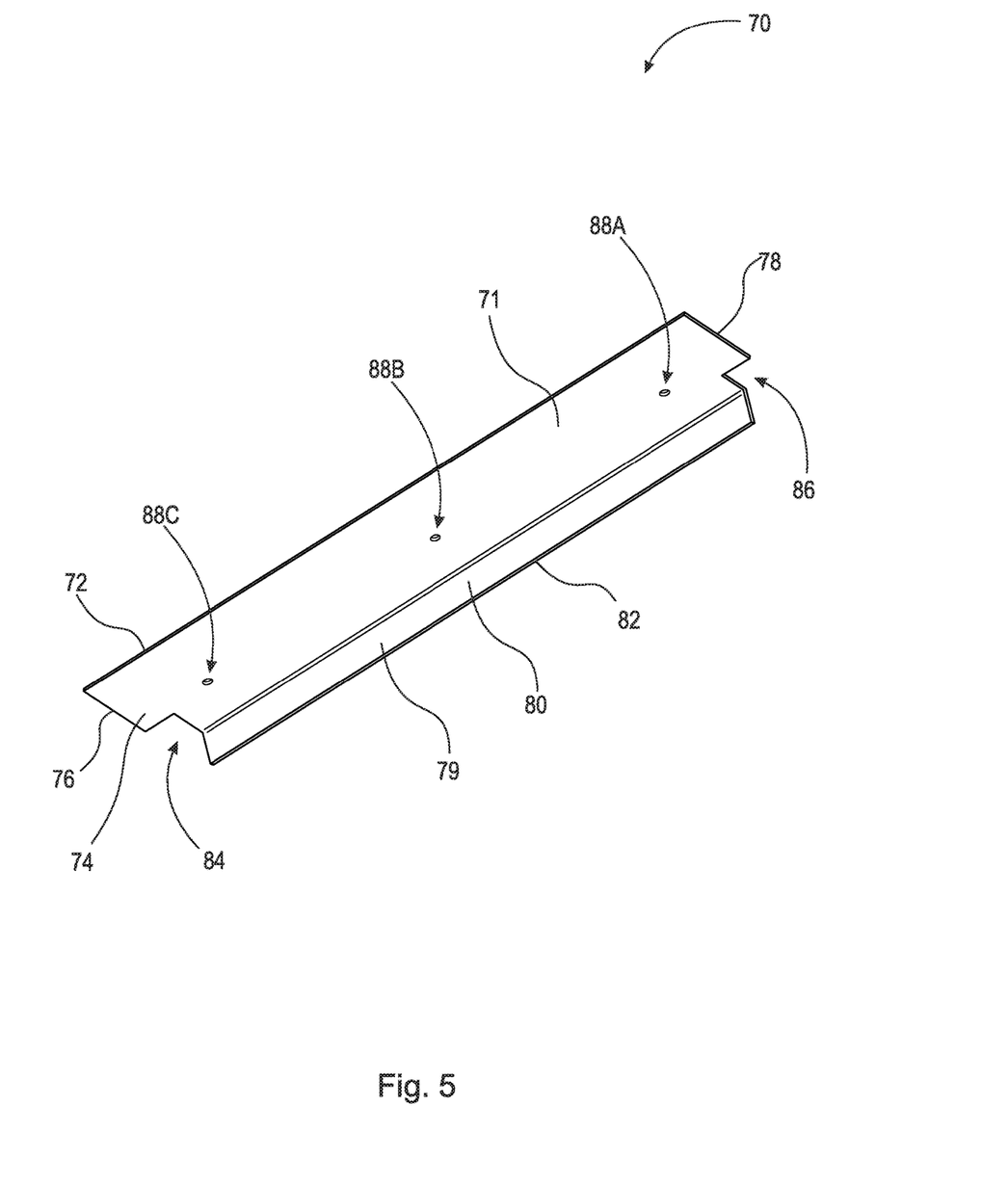
FIG. 5 is a bottom perspective view of the header panel shown in FIG. 1.

FIG. 5 is a bottom perspective view of header panel 70. Header panel 70 comprises platform 71 and inner lip 79. Platform 71 comprises top surface 72, bottom surface 74, left edge 76, right edge 78, cutout 84, and cutout 86. Platform 71 may include a plurality of through-bores, for example, through-bores 88A-C. Through-bores 88A-88C are arranged such that door mechanism plate 90 can be secured to header panel 70. However, any number of through-bores suitable to secure door mechanism plate 90 to header panel 70 may be used. Furthermore, door mechanism plate 90 may be secured to header panel 70 using other suitable means, such as welds or adhesives. Inner lip 79 is substantially perpendicular to platform 71 and comprises outer surface 80 and inner surface 82. Platform 71 is secured to right wall 30 and left wall 50. Specifically, right edge 78 is secured to top edge 32 and left edge 76 is secured to top edge 52. Any suitable means for securing header panel 70 to right wall 30 and left wall 50 may be used, for example, welds, adhesives, or fasteners.

Figure 6:
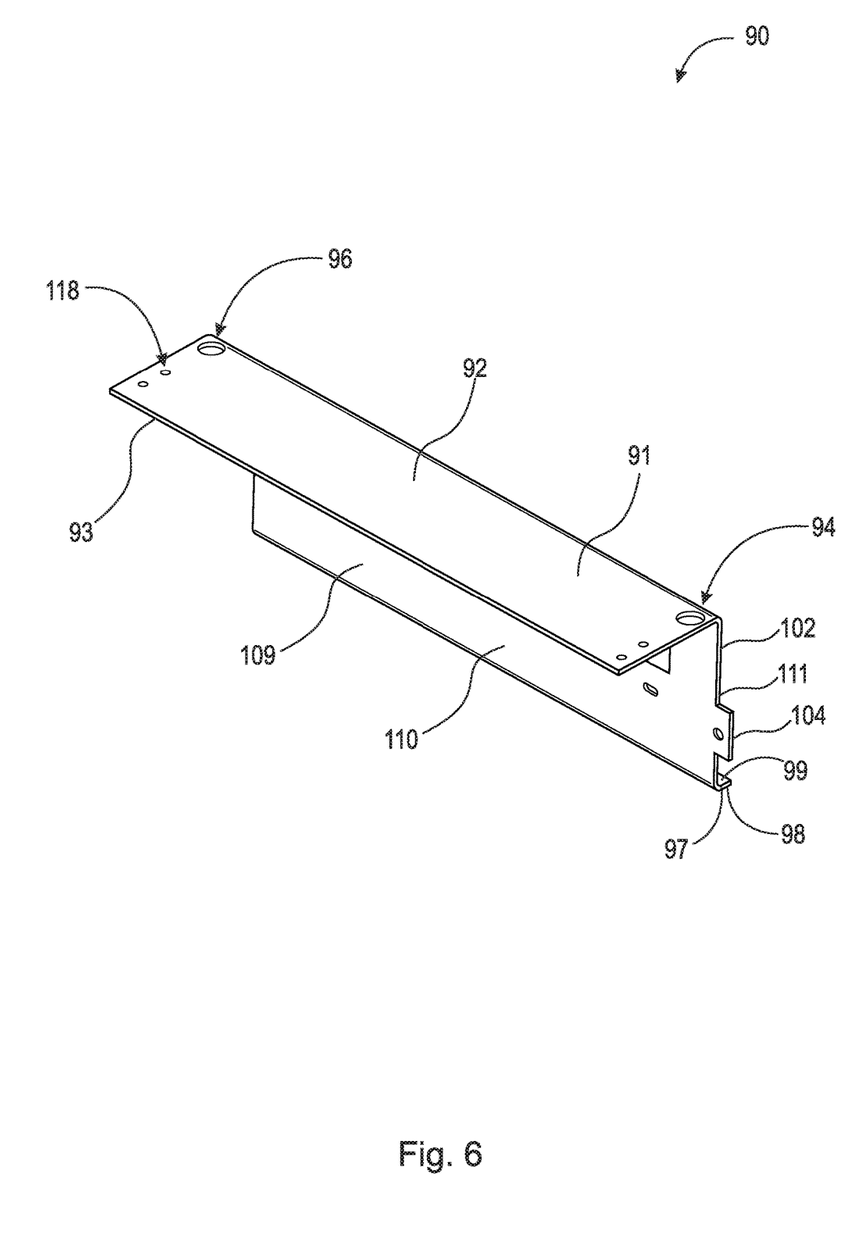
FIG. 6 is a top perspective view of the door mechanism plate shown in FIG. 1.
Figure 7:
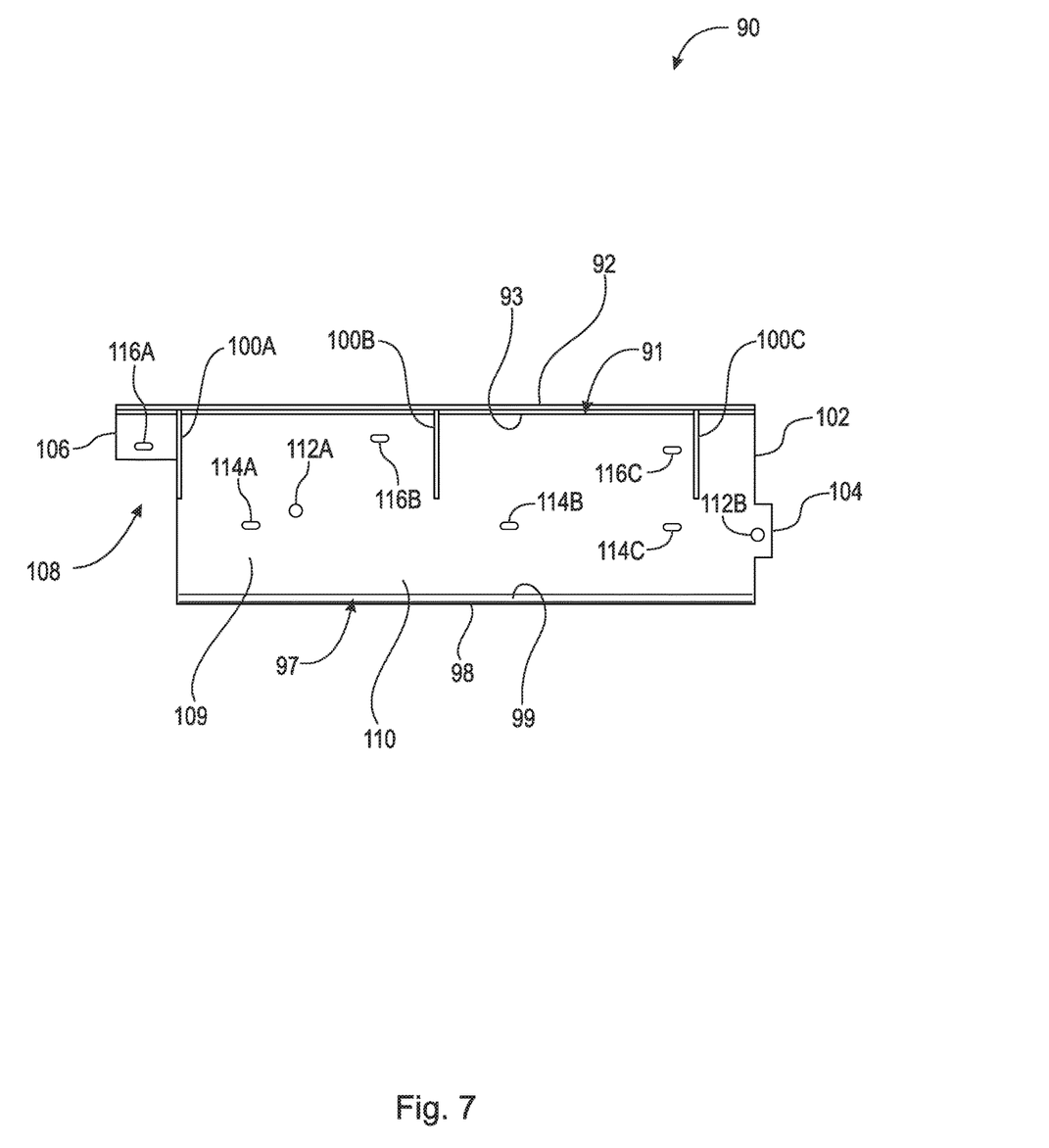
FIG. 7 is a front elevational view of the door mechanism plate shown in FIG. 6.
Figure 8:
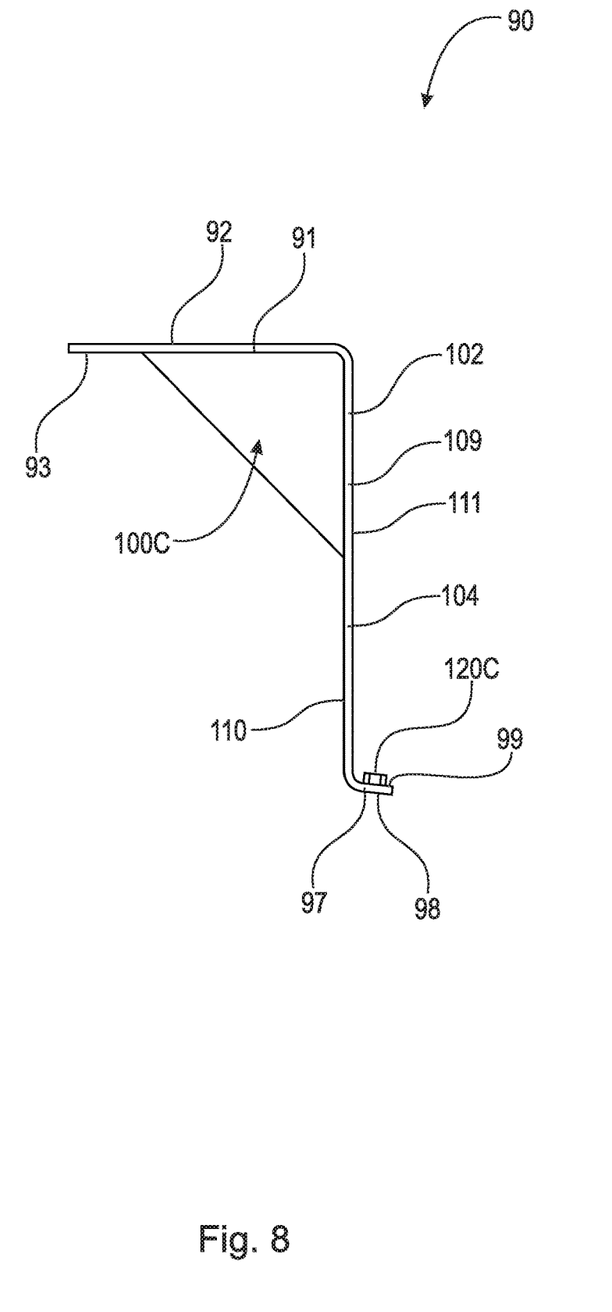
FIG. 8 is a right-side elevational view of the door mechanism plate shown in FIG. 6.
Figure 9:
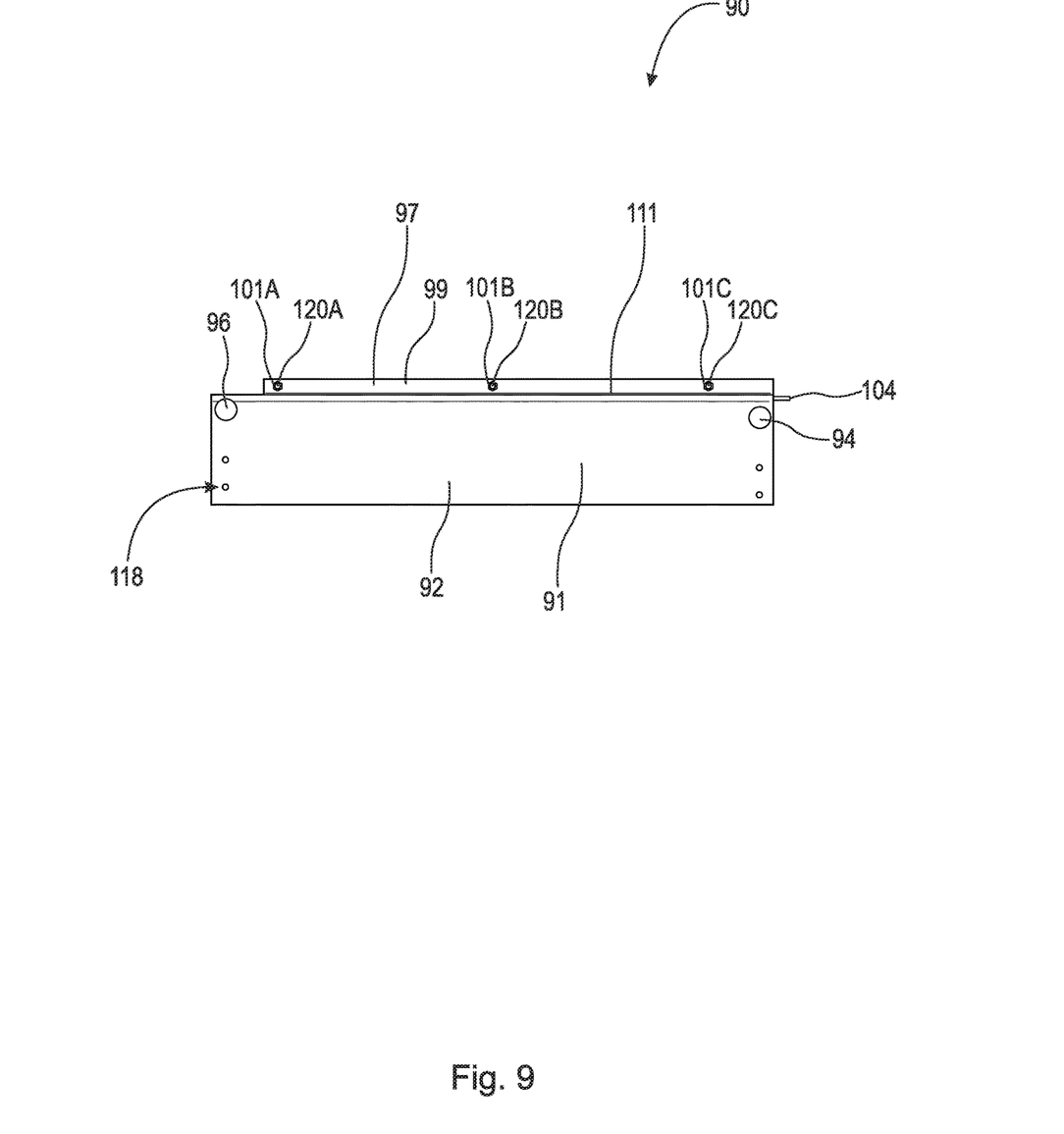
FIG. 9 is a top elevational view of the door mechanism plate shown in FIG. 6.

FIG. 6 is a top perspective view of door mechanism plate 90. FIG. 7 is a front elevational view of door mechanism plate 90. FIG. 8 is a right-side elevational view of door mechanism plate 90. FIG. 9 is a top elevational view of door mechanism plate 90. Door mechanism plate 90 comprises platform 91, plate 90, and lip 97. Platform 91 comprises top surface 92, bottom surface 93, rod hole 94, and rod hole 96. In an example embodiment, platform 91 comprises a plurality of through-bores 118. Plate 109 comprises left edge 102, right edge 106, inner surface 110, outer surface 111, tab 104, and cutout 108. Plate 109 may further comprise holes 112A-B, slots 114A-C, and slots 116A-C. Slots 114A-C and slots 116A-C are arranged to secure door mechanism plate 90 to the van interior wall. It should be appreciated that any number of slots or holes suitable to secure door mechanism plate 90 to the van interior wall may be used. Lip 97 comprises bottom surface 98 and top surface 99. Lip 97 may further comprise a plurality of through-bores, for example, through-bores 101A-C. When door mechanism plate 90 is secured to header panel 70, bottom surface 98 abuts against top surface 72 and through-bores 101A-C are aligned with through-bores 88A-C, respectively. A plurality of fasteners are guided through the respective through-bores and secured using nuts 120A-C, respectively. Door mechanism plate 90 may further comprise supports. In the example embodiment shown, door mechanism plate 90 comprises supports 100A-C. Supports 100A-C are designed substantially as trusses arranged between inner surface 110 and bottom surface 93. It should be appreciated that any number of supports suitable to provide support to platform 91 may be used. It should also be appreciated that door mechanism plate 90 may also comprise no supports.

Figure 10:
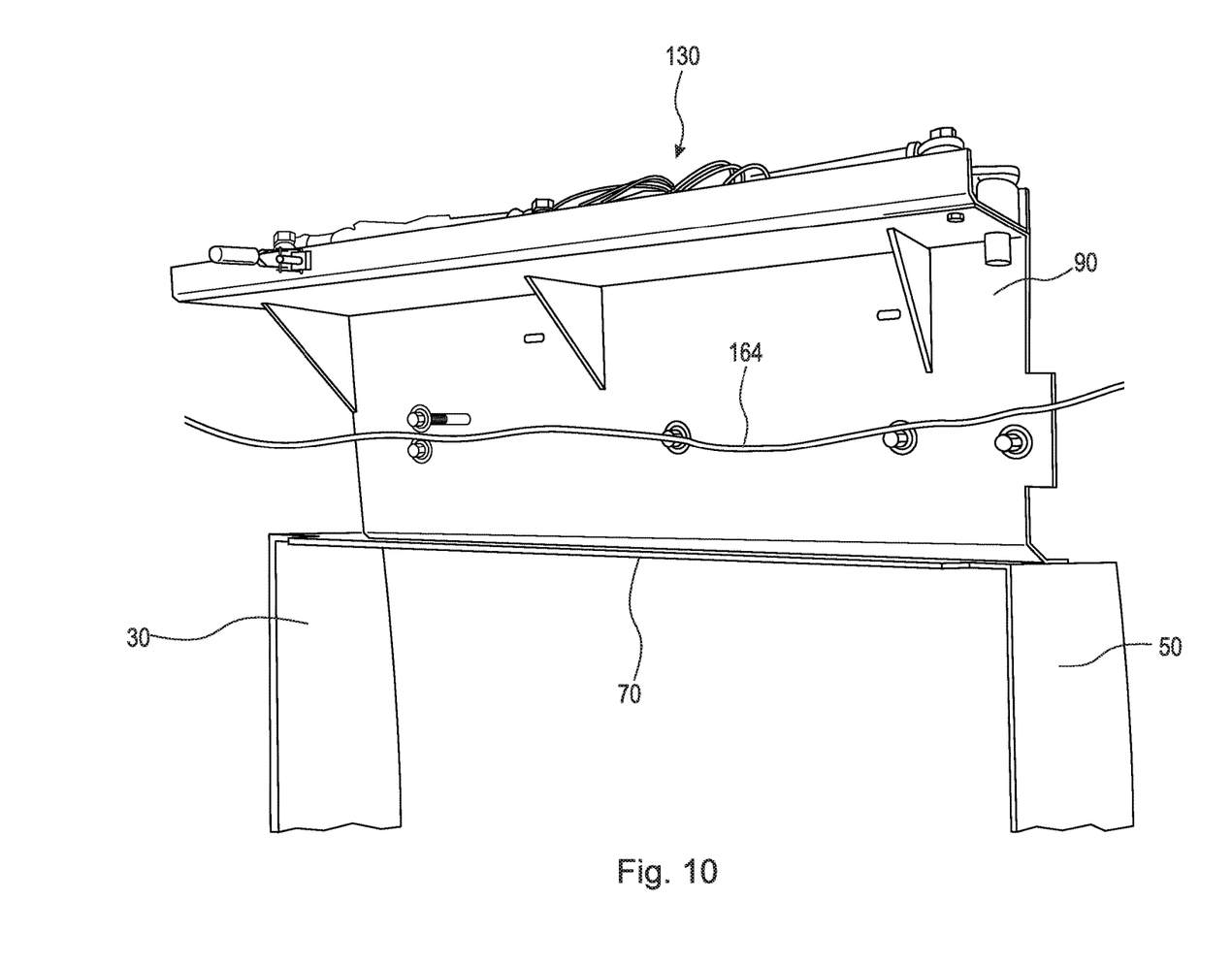
FIG. 10 is a perspective view of a van door assembly installed in a van.
Figure 11:
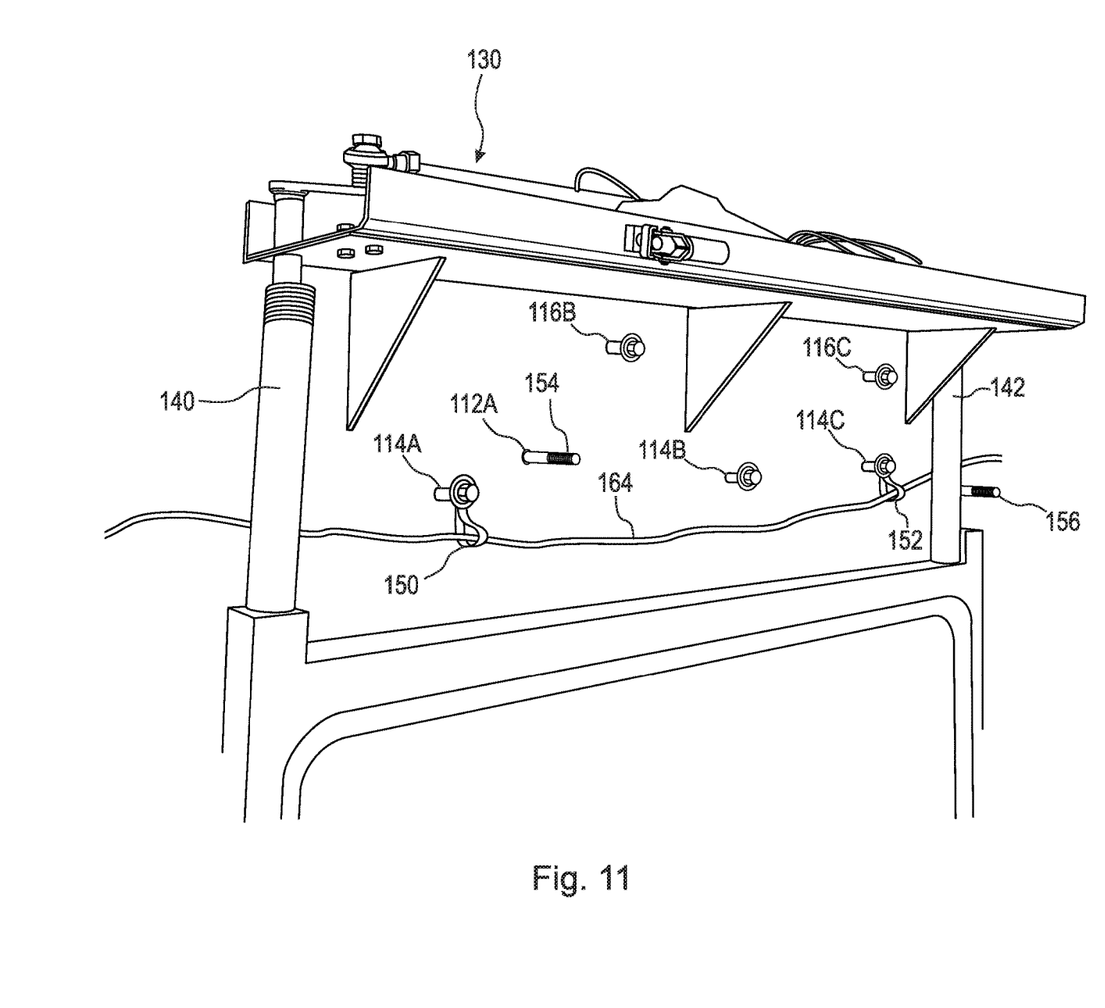
FIG. 11 is a perspective view of a van door assembly installed in a van, with door actuator rods.
Figure 12:
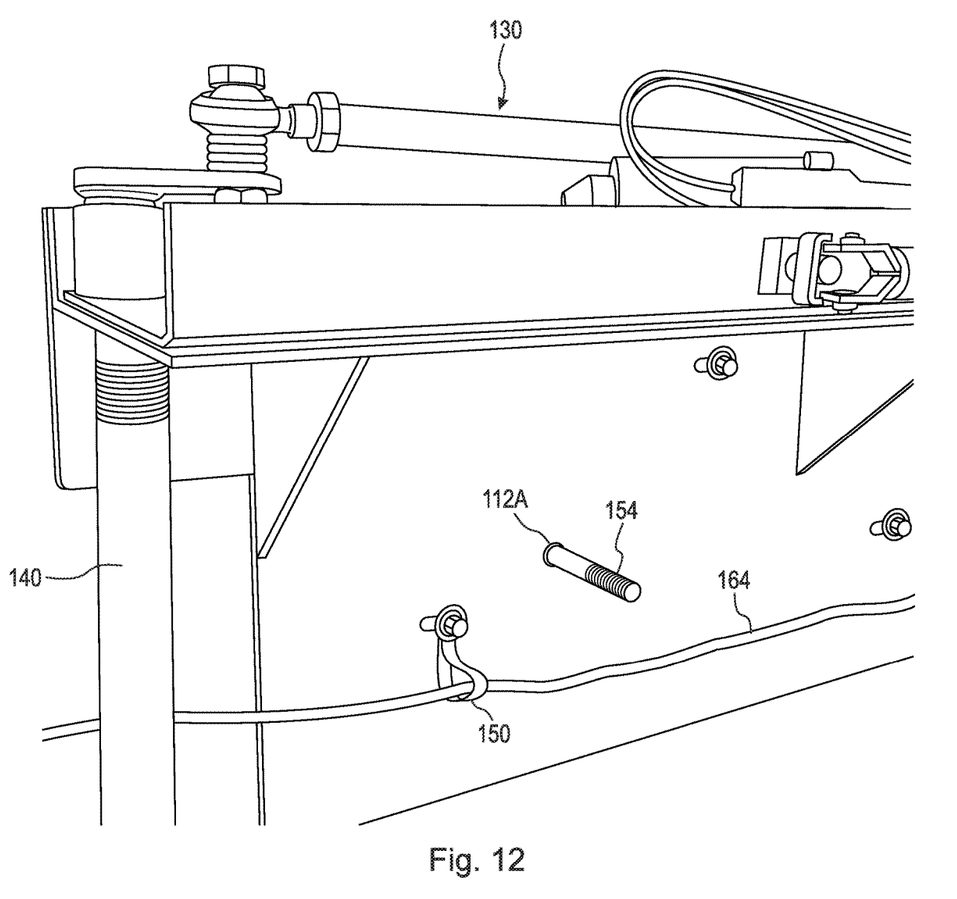
FIG. 12 is a detailed perspective view of the van door assembly installed in a van, as shown in FIG. 11.
Figure 13:
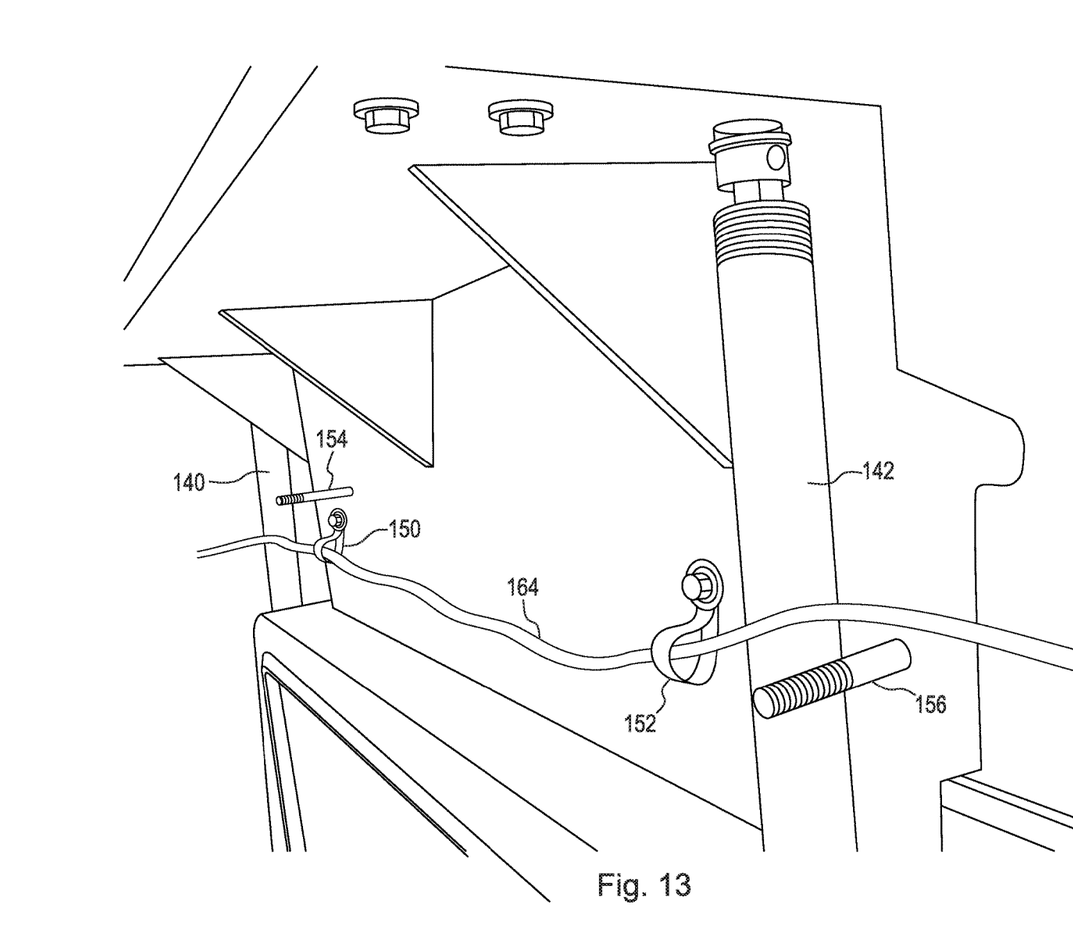
FIG. 13 is a detailed perspective view of the van door assembly installed in a van, as shown in FIG. 11; and, FIG. 14 is a perspective view of a van door assembly installed in a van, with the airbag and airbag inflator installed.
Figure 14:
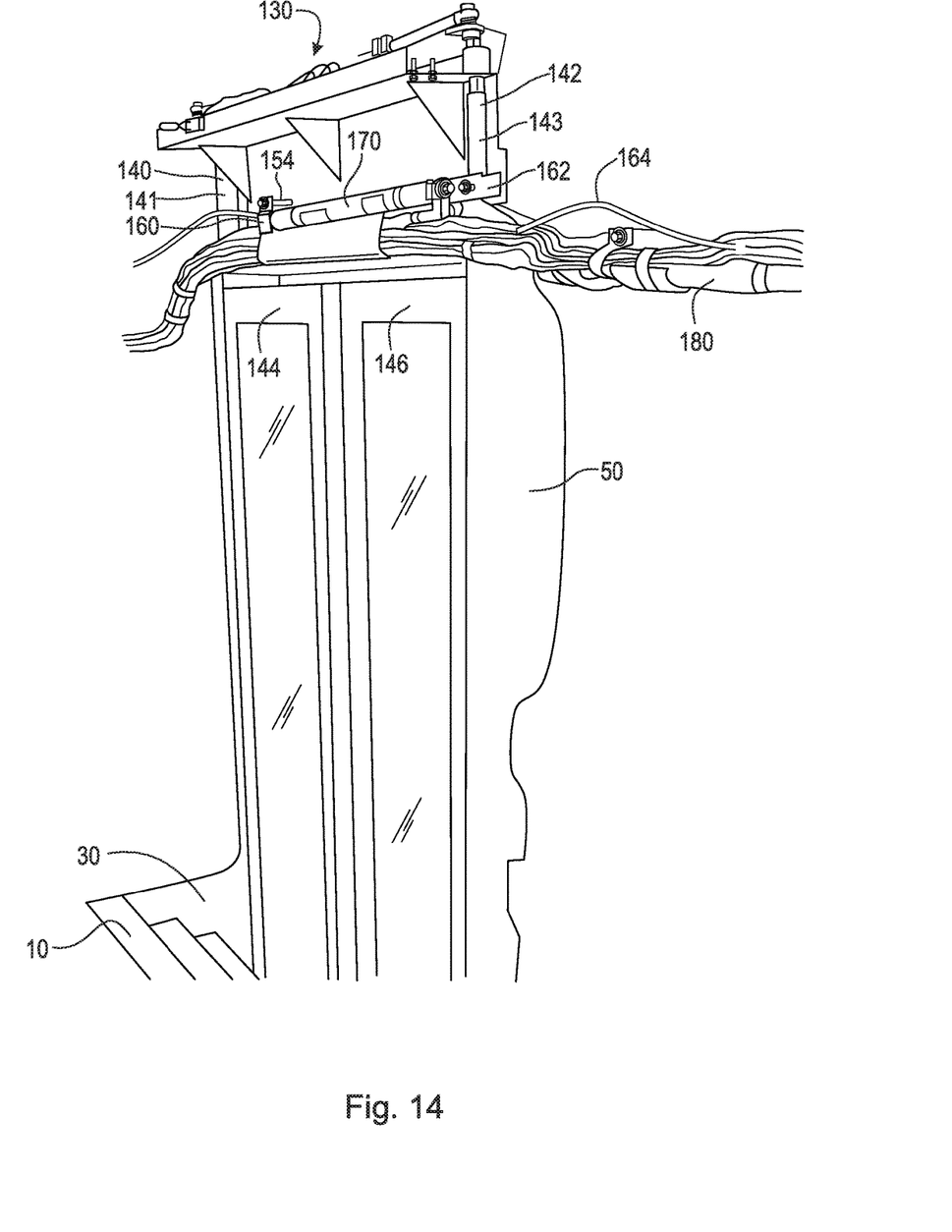

FIG. 10 is a perspective view of van door assembly 1 installed in a van. FIG. 11 is a perspective view of van door assembly 1 installed in a van, with door actuator rods 140 and 142. FIG. 12 is a detailed perspective view of van door assembly 1 installed in a van. FIG. 13 is a detailed perspective view of van door assembly 1 installed in a van. FIG. 14 is a perspective view of a van door assembly installed in a van, with airbag 180 and airbag inflator 170 installed. As shown in the figures, door mechanism 130 is arranged on top surface 92. Door mechanism 130 can be secured to door mechanism plate 90 by using, for example, fasteners through through-bores 118. When door mechanism 130 is secured to door mechanism plate 90, door actuator rod 140 extends downwardly through rod hole 96 and cutout 86 and connects to right door 144. Similarly, door actuator rod 142 extends downwardly through rod hole 94 and cutout 84 and connects to left door 146. Plate 109 is secured to the van interior wall via fasteners through slots 114A-C and slots 116A-C. Additionally, brackets 150 and 152 are secured to inner surface 110, for example, by fasteners in slots 114A and 114C, respectively. Brackets 150 and 152 support cable 164. Bolts 154 and 156 are secured in holes 112A and 112B, respectively, using any suitable means. Bolts 154 and 156 may, for example, be welded in holes 112A and 11B, respectively. Bolts 154 and 156 extend from inner surface 110 and are used to secure airbag inflator 170 via brackets 160 and 162, respectively. Door actuator rods 140 and 142 may also comprise protective sleeves 141 and 143, respectively. Protective sleeves 141 and 143 protect airbag 180 from abrasion from door actuator rods 140 and 142, respectively. As is shown in the figures, the arrangement of van door assembly, specifically the positioning of door mechanism plate 90, allows door mechanism 130 to open and close doors 144 and 146 without interfering with airbag 180 or airbag inflator 170. This arrangement allows a curtain airbag to deploy downward to provide maximum protection.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

1 Van door assembly
10 Steps
12 Side
14 Side
15 Bottom lip
16 Side
18 Side
20 Threshold
21 Top surface
22 Bottom surface
24 Through-bores
30 Right wall
31 Through-bore
32 Top edge
34 Front edge
35 Edge portion
36 Rear edge
38 Edge
40 Bottom edge
42 Edge
44 Outer surface
46 Inner surface
50 Left wall
52 Top edge
54 Front edge
55 Edge portion
56 Rear edge
58 Edge
60 Bottom edge
62 Edge
64 Inner surface
66 Outer surface
70 Header panel
71 Platform
72 Top surface
74 Bottom surface
76 Left edge
78 Right edge
79 Inner lip
80 Outer lip
82 Inner surface
84 Cutout
86 Cutout
88A Through-bore
88B Through-bore
88C Through-bore
90 Door mechanism plate
91 Platform
92 Top surface
93 Bottom surface
94 Rod hole
96 Rod hole
97 Lip
98 Bottom surface
99 Top surface
100A Support
100B Support
100C Support
101A Through-bore
101B Through-bore
101C Through-bore
102 Left edge
104 Tab
106 Right edge
108 Cutout
109 Plate
110 Inner surface
111 Outer surface
112A Hole
112B Hole
114A Slot
114B Slot
114C Slot
116A Slot
116B Slot
116C Slot
118 Through-bores
120A Nut
120B Nut
120C Nut
130 Door mechanism
140 Door actuator rod
141 Protective sleeve
142 Door actuator rod
143 Protective sleeve
144 Right door
146 Left door
150 Bracket
152 Bracket
154 Bolt
156 Bolt
160 Bracket
162 Bracket
164 Cable
170 Airbag inflator
180 Airbag

What is claimed is:
1. A van door assembly, comprising:
a header panel including a top surface and one or more cutouts; and,
a door mechanism plate, including:
a plate connected to the header panel; and,
a platform connected to the plate, the platform having one or more rod holes;

wherein each of the one or more rod holes is substantially aligned with each of the one or more cutouts, respectively.

2. The van door assembly as recited in claim 1, further comprising a first wall connected to the header panel.

3. The van door assembly as recited in claim 2, further comprising a second wall connected to the header panel.

4. The van door assembly as recited in claim 2, further comprising one or more steps connected to the first wall.

5. The van door assembly as recited in claim 1, wherein the door mechanism plate further comprises one or more supports connected to the plate and the platform.

6. The van door assembly as recited in claim 1, wherein the door mechanism plate is arranged to secure an airbag and/or an airbag inflator.

7. The van door assembly as recited in claim 6, wherein the airbag and/or airbag inflator is secured to the door mechanism plate via one or more brackets.

8. The van door assembly as recited in claim 1, wherein a door mechanism is arranged to be secured on the platform.

9. The van door assembly as recited in claim 8, wherein the door mechanism comprises one or more door actuator rods extending down through the respective one or more rod holes and the respective one or more cutouts.

10. The van door assembly as recited in claim 1, wherein the door mechanism plate further comprises a lip connected to the plate, wherein the lip is secured to the top surface.

11. The van door assembly as recited in claim 1, wherein the platform is arranged substantially parallel to the top surface.

12. The van door assembly as recited in claim 1, wherein the platform is arranged substantially perpendicular to the plate.

13. A van door assembly, comprising:
  a header panel, including a top surface, a right edge, a left edge, and one or more cutouts; and,
  a door mechanism plate, including:
    a plate connected to the header panel, the plate having an inner surface and an outer surface;
    a platform connected to the plate, the platform having one or more rod holes;
  wherein:
    each of the one or more rod holes is substantially aligned with each of the one or more cutouts, respectively;
    the platform is arranged to support a door mechanism; and,
    the plate is arranged to secure an airbag and/or an airbag inflator.

14. The van door assembly as recited in claim 3, further comprising a right wall connected to the right edge.

15. The van door assembly as recited in claim 14, further comprising a left wall connected to the left edge.

16. The van door assembly as recited in claim 15, further comprising one or more steps connected to at least one of the right wall and the left wall.

17. The van door assembly as recited in claim 13, wherein the door mechanism plate further comprises one or more supports extending from the inner surface to the platform.

18. The van door assembly as recited in claim 13, wherein the airbag and/or airbag inflator is secured to the plate via one or more brackets.

19. The van door assembly as recited in claim 13, wherein the door mechanism comprises one or more door actuator rods extending down through the respective one or more rod holes and the respective one or more cutouts.

20. A method of securing a door mechanism, the method comprising:
  securing a door mechanism plate to a van or bus behind an airbag;
  securing a door mechanism to the door mechanism plate such that the door mechanism does not impede the airbag; and,
  securing a door actuator rod to a door such that the door actuator rod does not impede the airbag.

* * * * *